UNITED STATES PATENT OFFICE.

T. WOODWARD SHUGART AND CHARLEY D. CLIFTON, OF DUBLIN, TEXAS.

INSECTICIDE.

SPECIFICATION forming part of Letters Patent No. 333,893, dated January 5, 1886.

Application filed October 26, 1885. Serial No. 180,981. (No specimens.)

*To all whom it may concern:*

Be it known that we, T. WOODWARD SHUGART and CHARLEY D. CLIFTON, both citizens of the United States, and residents of Dublin, in the county of Erath and State of Texas, have invented a certain new and useful Inflammable Composition for Destroying Insects, &c.; and we do hereby declare that the following is a full, clear, and exact description of the invention, which will enable others skilled in the art to which it appertains to make and use the same.

Our invention relates to compounds or compositions of an inflammable nature for exterminating destructive animals and insects that burrow under ground—such as prairie-dogs, gophers, moles, ants, &c.; and it consists in the liquid compound which will be hereinafter more fully described and claimed.

In the preparation of this compound or composition we employ the following ingredients in substantially the proportions set opposite to each, viz: alkanet-root, two ounces; arsenious acid, two ounces; gum-camphor, four ounces; iodine resubl., one ounce; phosphorus, two ounces; sulphur resubl., forty-eight ounces; bisulphide carbon, quantity sufficient to make one gallon.

We first mix the phosphorus with half a gallon of the bisulphide carbon. Let it stand one hour, and then shake it well, after which we add the sulphur, arsenic, and alkanet-root. This mixture should then stand for twenty-four hours, it being shaken occasionally, and after the expiration of this period add the gum-camphor and iodine, after first mixing the same thoroughly with one quart of the bisulphide carbon. Lastly, add the remainder of the carbon sufficient to make one gallon of the fluid. The composition is then ready for bottling, and will keep any length of time if the bottles or vials containing it are properly sealed.

This composition is used as follows: Pour from two to four ounces into the ant-hill, mole-hill, or excavation made by the gopher or other animal. Light it with a match before it has been entirely absorbed into the ground, and let it burn freely from one to two minutes, after which it should be covered with dirt. It will be found that the fumes which result will thoroughly permeate the subterranean passages and effectually destroy the ants or other animals which it is sought to exterminate.

We are aware that bisulphide of carbon, sulphur, and phosphorus have been used together for the purpose. Such mixture, therefore, we do not seek to claim; but,

Having thus described our invention, what we claim, and desire to secure by Letters Patent of the United States, is—

The hereinbefore-described inflammable composition for exterminating destructive animals and insects, composed of the following ingredients mixed in substantially the proportions set forth, viz: alkanet-root, two ounces; arsenious acid, two ounces; gum-camphor, four ounces; iodine resubl., one ounce; phosphorus, two ounces; sulphur resubl., forty-eight ounces; bisulphide carbon, quantity sufficient to make one gallon.

In testimony that we claim the foregoing as our own we have hereunto affixed our signatures in presence of two witnesses.

T. WOODWARD SHUGART.
CHARLEY DAVE CLIFTON.

Witnesses:
GEO. L. OLDHAM,
C. R. GILLETT.